United States Patent [19]

Bainbridge

[11] Patent Number: 4,886,696
[45] Date of Patent: Dec. 12, 1989

[54] CORRUGATED PAPERBOARD AUTOMOTIVE LINER

[75] Inventor: David W. Bainbridge, Lakewood, Colo.

[73] Assignee: Manville Corporation, Denver, Colo.

[21] Appl. No.: 192,096

[22] Filed: May 10, 1988

[51] Int. Cl.$^4$ .................... B32B 3/28; E04B 1/82
[52] U.S. Cl. .................... 428/184; 428/182; 428/186; 428/252; 428/286; 428/304.4; 428/318.4; 428/318.8; 428/137; 428/138; 296/211; 296/214; 181/284; 181/288; 181/290; 181/291; 181/292; 181/293
[58] Field of Search ............ 428/180, 181, 182, 183, 428/184, 185, 186.3, 913.3, 252, 286, 319.9, 304.4, 318.4, 137, 138, 136; 181/288, 286, 284, 290–294; 296/211, 213, 214

[56] References Cited

U.S. PATENT DOCUMENTS

| | | | |
|---|---|---|---|
| 2,043,988 | 6/1936 | Brown | 428/186 |
| 3,293,107 | 12/1966 | Wells et al. | 428/186 |
| 3,507,355 | 4/1970 | Lawson | 181/292 |
| 4,077,821 | 3/1978 | Doerfling | 428/319.7 |
| 4,119,451 | 10/1978 | Fujii | 156/211 |
| 4,119,749 | 10/1978 | Roth et al. | 428/160 |
| 4,131,702 | 12/1978 | Alfter et al. | 428/76 |
| 4,150,186 | 4/1979 | Kazama | 296/214 |
| 4,227,356 | 10/1980 | Stern et al. | 428/137 |
| 4,242,172 | 12/1980 | Fujii | 156/499 |
| 4,479,992 | 10/1984 | Hësseker et al. | 428/116 |

FOREIGN PATENT DOCUMENTS 0177742 10/1983 Japan .................... 428/186

Primary Examiner—Ellis P. Robinson
Assistant Examiner—Donald J. Loney
Attorney, Agent, or Firm—John D. Lister; Cornelius P. Quinn; Gregory Evearitt

[57] ABSTRACT

An automotive headliner comprised of a laminate of double corrugated paperboard. Perforations in all the sheets of the laminate except the back paperboard sheet improve the acoustical performance of the liner. A vapor barrier on the back sheet prevents entry of moisture into the laminate from the roof, and a layer of sound dampening material on the front face of the laminate improves the sound absorption of the laminate. The front corrugation is larger than the back corrugation. When molding the laminate it is first moisturized, then heat molded. Heat is applied until the laminate has regained its rigidity.

6 Claims, 2 Drawing Sheets

CORRUGATED PAPERBOARD AUTOMOTIVE LINER

FIELD OF THE INVENTION

This invention relates to panels for lining the interior face of an automotive roof. More particularly, it relates to a self-supporting paperboard roof liner.

BACKGROUND OF THE INVENTION

The interior face of an automobile roof is commonly covered or lined with material which presents an attractive appearance and also acts as a sound absorber. Molded fiber glass panels and foam liners are examples of such liners. Basically, these products adequately perform the functions for which they were designed, but they are too expensive to be installed in economy automobiles. The economy class requies a liner that is not only attractive and provides an acoustical function, but is also considerably less costly.

One of the materials designers usually consider when confronted with the need to produce an inexpensive shaped product is wood fiber. This is because wood fibers are readily available at relatively low prices and can be formed into various shapes by a variety of manufacturing techniques. Although the use of headliners formed from wood fibers is not new, previous attempts to make a product acceptable to today's market have failed. Hardboard liners, for example, have been manufactured from a wood fiber mat formed from an aqueous fiber slurry. The mat included suitable resins to enable it to be densified and shaped under heat and pressure. The resulting product was too heavy, was difficult to mold, and had poor acoustical properties.

In efforts to make lighter liners and to reduce costs, attempts have been made to produce liners from other forms of wood fiber products. Kraft paper has been used to produce liners, as has corrugated paperboard formed from a corrugated medium sandwiched between two paperboard facers. In general, however, the resulting products, unless modified severely, lack adequate sound absorbing qualities and are difficult to form into the dished shape of a liner without cracking.

An example of a headliner formed from corrugated paperboard is disclosed in U.S. Pat. No. 4,119,451. This patent describes a liner comprised of single corrugated paperboard which must be formed with notches in areas of sharp curvature. The width of the notches increases during molding to disperse molding stresses in order to avoid the formation of cracks. The patent is not concerned with the acoustical performance of the liner and does not suggest ways to increase the overall strength of the liner through use of a laminate other than a single corrugated base paperboard sheet.

Another example of a paperboard liner is disclosed in U.S. Pat. No. 4,131,702. The liner in this patent is encased in a foam layer on all sides in order to prevent loss of rigidity due to contact with moisture. No attempt was made to improve the acoustical performance of the liner apart from any acoustical benefit which may be provided by the foam material. Although a double corrugated liner is shown in the drawing, the description does not go into any details as to how the double layer is arranged with respect to the liner, nor does it comment on any of the parameters required of the double corrugated base member. It is clear from the disclosure of the patent that the paperboard unit, regardless of its construction, must be entirely encased in foam material.

Obviously, it would be highly desirable to have an automotive headliner of attractive appearance which could be formed from wood fibers, which possesses the beneficial qualities of a headliner discussed above, and which need not be limited to the designs of prior art paperboard liners.

SUMMARY OF THE INVENTION

This invention provides a self-supporting panel comprising front, back and median paperboard sheets spaced from each other in substantially parallel relationship so that the distance between the front sheet and the median sheet is less than the distance between the median sheet and the back sheet. Corrugated paperboard mediums are located between the median sheet and the front and back sheets, and are adhered to the sheets, thus forming a double corrugated paperboard panel. This arrangement is surprisingly strong. When the front and median sheets, as well as the corrugated mediums, are perforated, the panel exhibits surprisingly good sound absorbing properties.

Such a panel can be formed by first perforating the double corrugated paperboard laminate or panel, then moisturizing the laminate to substantially soften the paperboard and reduce its rigidity. The laminate is then pressed into the desired form in a heated mold, following which the shaped laminate is dried to increase the rigidity and strength of the panel.

To prevent moisture from penetrating the paperboard through condensate from the metal roof of the automobile, a vapor barrier is provided on the back surface of the laminate. In addition, the front face of the liminate may be given a decorative treatment, as by painting or covering it with a layer of fabric or foam-backed fabric. The layer of fabric or foam-backed fabric has the further advantage of dampening sound entering the liner. Certain types of paint, such as vinyl paints which are rubbery in nature, also provide a dampening effect. Other preferred parameters are discussed in more detail hereinafter.

The liner of this invention is a highly functional item which surprisingly is strong enough to allow other subassemblies of the automobile interior, such as, for example, interior lamps, visors, straps and hanger hooks, to be attached directly to the liner prior to installation of the liner. This results in significant labor savings since these separate items no longer have to be installed in separate individual steps.

Other features and aspects of the invention, as well as other benefits of the invention, will readily be ascertained from the more detailed description of the invention which follows.

DESCRIPTION OF THE PREFERRED EMBODIMENT

Figure 1:
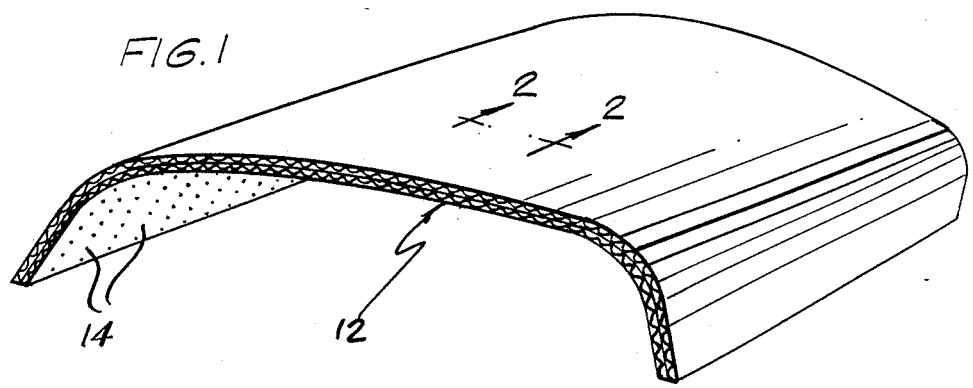
FIG. 1 is a pictorial view of an automotive headliner formed in accordance with the present invention.

Referring to FIG. 1, the headliner 10 of the present invention comprises a double corrugated paperboard laminate 12. The laminate is dished or concave to conform to the general shape of automotive headliners, the convex face being installed next to the roof of the automobile and the concave face being exposed to the interior of the automobile. Perforations 14 can be seen in the interior face of the laminate. The headliner may be installed by any of a variety of methods, generally utilizing clips or other attachment devices. Such attachment devices are not shown since they do not form part of the invention and since they are well known to those skilled in the art.

Figure 2:
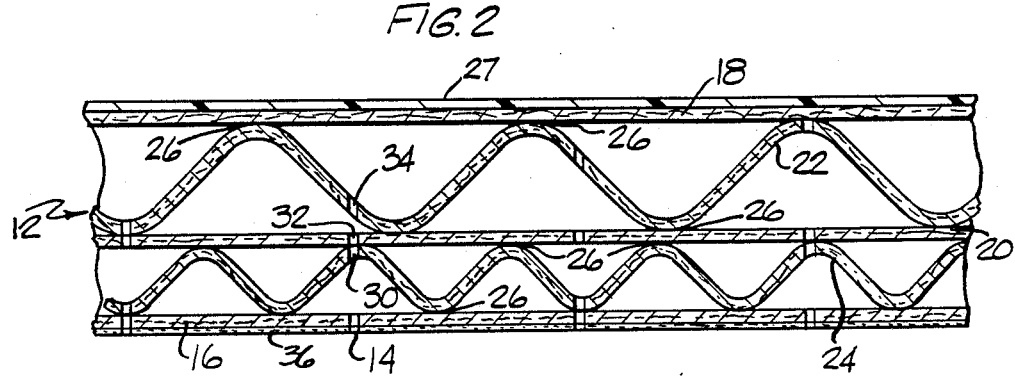
FIG. 2 is an enlarged partial sectional view of the headliner taken on line 2—2 of FIG. 1.

As shown in FIG. 2, the double corrugated paperboard laminate is comprised of a front or exposed paperboard facer or sheet 16, a back paperboard sheet 18 and an intermediate or median paperboard sheet 20. A first corrugated paperboard medium 22 occupies the space between the back and median sheets 18 and 20, and a second corrugated medium 24 occupies the space between the front and median sheets 16 and 20. The corrugated mediums 22 and 24 are attached to the paperboard sheets at their corrugation peaks by suitable adhesive 26, such as starch. The double corrugated paperboard laminate described thus far can be fabricated from the individual sheets and corrugated mediums or can be purchased ready-made from a paperboard manufacturer as desired. It will be understood that the components from which the laminate is fabricated, or the ready-made laminate itself, would be flat.

The corrugated medium 22 has larger individual corrugations or flutes than the corrugated medium 24, causing the distance between the median sheet 20 and the back sheet 18 to be greater than the distance between the median sheet and the front sheet 16. Although the corrugated mediums impart strength and rigidity to the assembly, it is not necessary that they be formed of paperboard which is as heavy as the paperboard used to make the front and back sheets. For example, in a preferred arrangement, the front, back and median sheets were comprised of paperboard weighing 69 pounds per 1000 square feet, while the corrugated mediums were comprised of paperboard weighing only 42 pounds per 1000 square feet.

Figure 3:
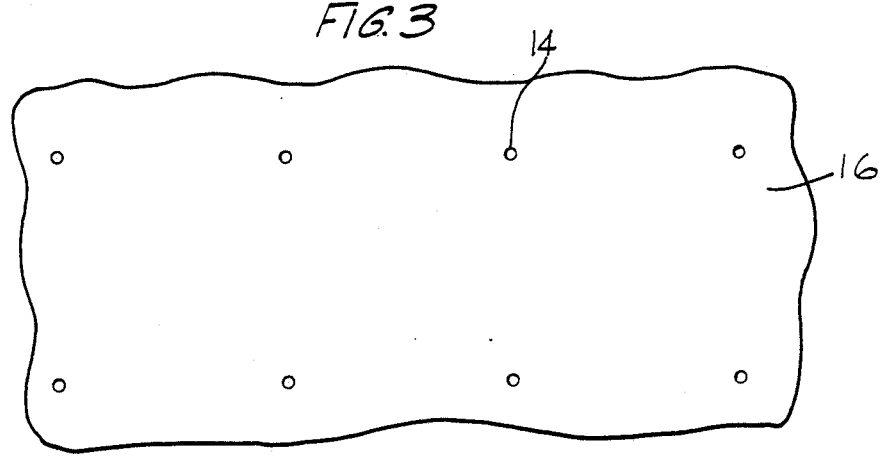
FIG. 3 is a plan view of the interior face of the portion of the headliner shown in FIG. 2.

Still referring to FIG. 2, a vapor barrier film 27 is laminated to the outer surface of the back sheet 18 to prevent condensation from the metal automobile roof from penetrating the paperboard liner. Any suitable vapor barrier material can be used, such as a polypropylene or polyethylene film. Referring also to FIG. 3, the front sheet 16 contains a series of closely spaced small diameter perforations 14 which extend through the corrugated medium 24, the median sheet 20 and the corrugated medium 22 as perforations 30, 32 and 34, respectively. As illustrated, the perforations 14, 30, 32 and 34 are aligned as a result of perforating these elements in a single perforating operation. Preferably,the back sheet 18 would not be perforated in order not to penetrate the vapor barrier 27. Although it is possible to perforate the back sheet if the vapor barrier film is laminated to the paperboard after the perforating step has been carried out, it is preferred that the back sheet not be perforated in order to avoid the risk of the film tearing at the unsupported area of an underlying perforation.

The perforations should be relatively closely spaced and should be small enough to adequately admit sound but not so large as to weaken the laminate. Perforations having a diameter of 1 mm and being spaced apart about ⅛ inch on center have been found to be an effective arrangement. While perforations in thick fibrous bodies such as relatively dense fibrous acoustical panels are known to substantially reduce noise levels, it was surprising to find the degree of effectiveness exhibited by the perforated double corrugated liner of the present invention. When tested according to the procedures of ASTM C-423 a sample of paperbord laminate constructed and dimensioned as described above had an NRC value of 0.35. This equivalent to the NRC value of a typical molded fiber glass headliner, having a density of 4 pcf and a thickness of 0.5 inch, which has a reputation of having excellent sound absorbing qualities. The perforations allow the sound waves to penetrate the paperboard and apparently to be absorbed in both the paperboard itself and in the cavities surrounding the corrugations of the laminate to an unexpected degree of efficiency.

Still referring to FIG. 2, the outer surface of the front sheet 16 would normally be coated to give the laminate a more decorative appearance, such as by the coating of paint 36. As stated above, paints which are rubbery in nature also act to somewhat deaden or dampen sound waves encountering the liner. The paint could be sprayed on the laminate either before or after the perforating operation, but if it is applied after the laminate has been perforated it should be controlled, as by the density of application or by its viscosity, to prevent the paint from clogging or significantly diminishing the size of the perforation in the front sheet 16.

Figure 4:
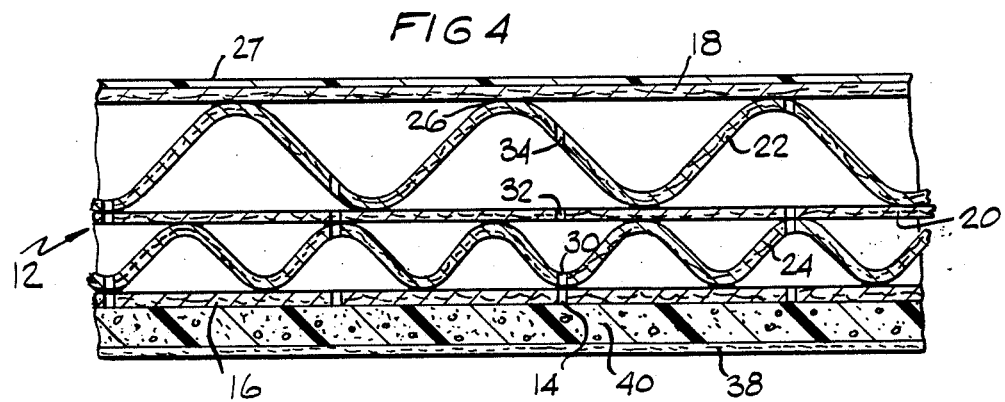
FIG. 4 is a view similar to that of FIG. 2, but showing a modification thereof.

As shown in FIG. 4, a fabric 38 having a foam backing 40 can be used instead of paint as an outer covering for the front sheet 16 of the laminate 12. The foam, which is of open cell structure such as, for example, open-cell polyether, more effectively dampens sound waves, and the fabric provides the decorative appearance to the assembly. If desired, fabric alone may be used as the covering material, although this would not function as well acoustically as the combination fabric and foam layer.

Figure 5:
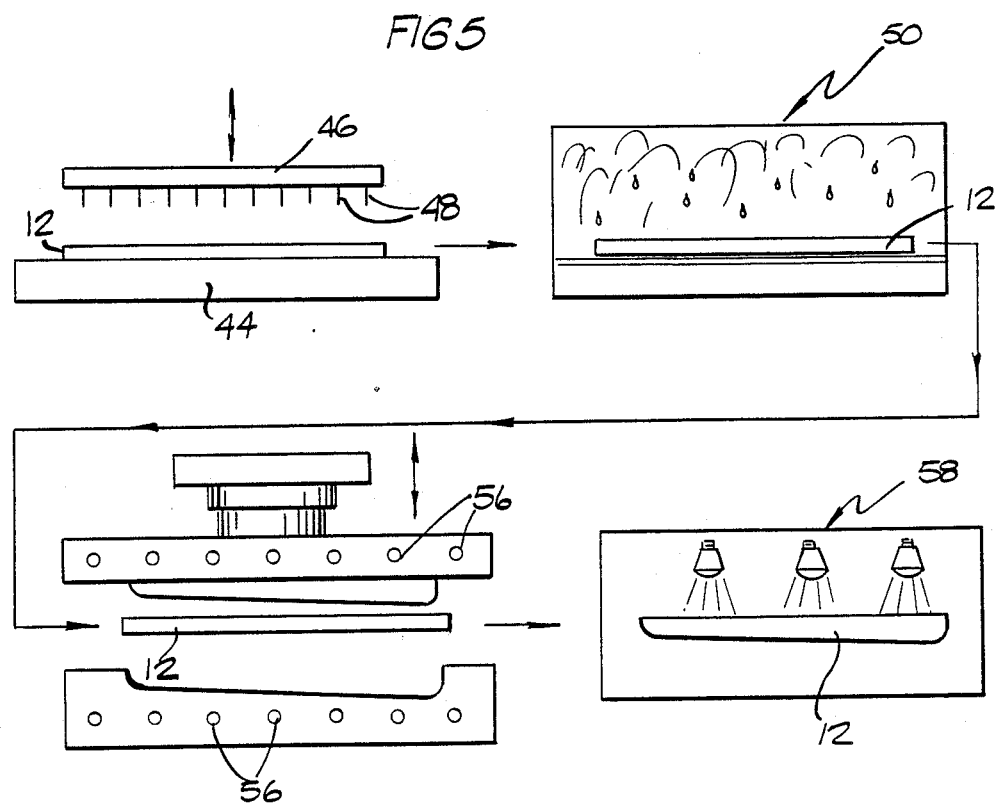
FIG. 5 is a schematic view of the method of forming the headliner of the present invention.

Referring to FIG. 5, the liner is formed by first introducing the laminate 12 to a perforating station 42. The laminate rests on a support 44 while a perforating head is moved down toward it by any suitable means so that the pins 48 penetrate the laminate. As stated earlier, movement of the perforating head preferably is controlled so that the pins do not extend into the back sheet of the laminate. At this point the vapor barrier film if present would be at the bottom of the laminate adjacent the support 44. It could instead be applied after the perforating operation as previously indicated.

After the laminate has been perforated it is subjected to a moisturizing operation at the moisturizing station 50. This may simply be a humidity chamber or a steam chamber. In any event the laminate remains in the chamber until it has been softened to the point where it can readily be molded into the final desired shape. By way of example, exposure to high humidity for 20 minutes was found to amply soften the paperboard material. This time can be reduced by using a steam chamber instead.

The softened laminate is then inserted in a mold comprised of male and female members 52 and 54, respectively. Both mold members contain heating units 56, such as electrical heaters or hot water lines, to maintain the press surfaces at a predetermined temperature. This may vary with the desired shape of the liner, the rigidity of the laminate when introduced into the mold and the construction details of the laminate. It has been found, however, that when the temperature of the mold is in the range of about 325° F. to 360° F. the molding operation proceeded with optimum results, requiring about 15 to 60 seconds depending on conditions. Generally, the higher the heat the shorter the molding operation. If the heat of the press mold and the length of time the laminate is in the mold are found to be enough to drive out a sufficient amount of moisture to restore adequate rigidity to the paperboard, the fabrication operation is at an end. If more rigidity is required the laminate can be further heated in a heating station 58 after removal from the mold.

It was found that a double corrugated liner is required because a liner comprised of only a single corrugated layer tends to wrinkle as a result of the molding operation and does not have the acoustical and strength characteristics required of the finished liner. It has also been found that the smaller corrugated medium should be adjacent the interior face of the liner, or in other words should correspond to the concave face of the liner in order for the molding operation to proceed without danger of cracking. The larger corrugated medium is needed for the strength and rigidity it contributes to the liner, but because of its lesser ability to be molded without wrinking is placed on the convex side of the liner which is not as sharply curved during molding. In a preferred arrangement, for the overall ability of the laminate to be molded and for the strength and acoustical benefits provided, the outer or larger corrugated medium is comprised of a C flute, which is 140 mils thick and contains 39 flutes per foot, and the inner or smaller corrugated medium is comprised of a B flute, which is 120 mils thick and contains 50 flutes per foot. The paperboard industry also makes available A flutes, which are 190 mils thick and contain 36 flutes per foot, and E flutes, which are 40–70 mils thick and contain 80–120 flutes per foot. Because of the different requirements of the outer and inner corrugated mediums, C flutes or A flutes would be used as the outer or larger corrugated mediums, while B flutes or E flutes would be used as the inner or smaller corrugated mediums.

In tests run to determine the strength of the laminate, 3" by 12" samples having a thickness of 0.286" were prepared from corrugated mediums comprised of C and A flutes and supported across a 10" span while being subjected to loading by a crosshead moving at a speed of 0.2" per minute. The tests were performed in both the corrugated direction of the samples and the cross-corrugated direction. For the corrugated direction, the average flexural load withstood was 14.2 pounds and the average modulus of rupture was 870 psi. For the cross-corrugated direction, the average flexural load was 13.2 pounds and the average modulus of rupture was 805 psi. In both cases the results are well beyond the minimum required strength requirements.

It should now be understood after reading the foregoing description that the invention is not necessarily limited to all the specific details described, but that changes to certain features of the preferred embodiment, which do not affect the overall basic function and concept of the invention, may be made by those skilled in the art without departing from the spirit and scope of the invention, as defined in the appended claims.

What is claimed is:

1. A self-supporting headliner panel for lining the interior face of an automotive roof, comprising:
    front, back and median paperboard sheets spaced from each other in substantially parallel relationship, the distance between the front sheet and the median sheet being less than the distance between the median sheet and the back sheet;
    corrugated paperboard mediums located between the median sheet and the front and back sheets and being adhered thereto;
    a vapor barrier on the outer face of the back paperboard sheet to prevent condensation from the metal roof of a vehicle in which the headliner panel is installed from penetrating the panel;
    the front and median sheets and the corrugated mediums containing a plurality of relatively small diameter perforations for improving the sound absorption of the panel; and
    a layer of decorative material on the outer face of the front paperboard sheet, said layer permitting passage therethrough of ambient air, thus permitting sound waves to reach and pass through the perforations in the front paperboard sheet;
    the panel containing heat-molded nonplanar portions.

2. A panel according to claim 1, wherein the layer of decorative material comprises a layer of sound dampening material.

3. A panel according to claim 2, wherein the layer of sound dampening material comprises a coating of paint, the perforations in the front sheet being exposed throughout the coating of paint.

4. A panel according to claim 2, wherein the layer of sound dampening material comprises a sheet of fabric covering the perforations.

5. A panel according to claim 4, wherein the layer of sound dampening material further includes a layer of open-cell foam between the fabric and the front paperboard sheet.

6. A panel according to claim 1, wherein the back paperboard sheet is unperforated.

* * * * *